United States Patent [19]

Hirota et al.

[11] 3,846,673

[45] *Nov. 5, 1974

[54] HIGH VOLTAGE REGULATION CIRCUIT FOR A COLOR TELEVISION RECEIVER

[75] Inventors: Ryoichi Hirota; Tooru Fujishima, both of Yokohama; Gentaro Miyazaki, Fujisawa; Tadahiko Iwasaki, Kamakura; Mitsuharu Akatsu; Tomoo Kinoshita, both of Yokohama, all of Japan

[73] Assignee: Hitachi, Ltd., Tokyo, Japan

[ * ] Notice: The portion of the term of this patent subsequent to Sept. 28, 1988, has been disclaimed.

[22] Filed: July 7, 1971

[21] Appl. No.: 160,481

Related U.S. Application Data

[62] Division of Ser. No. 809,244, March 21, 1969, Pat. No. 3,609,447.

[52] U.S. Cl. ........... 315/27 TD, 315/27 SR, 315/29, 315/387

[51] Int. Cl. .......................................... H01j 29/70

[58] Field of Search .......... 315/27 R, 27 TD, 27 SR, 315/29

[56] References Cited

UNITED STATES PATENTS

| | | | |
|---|---|---|---|
| 2,854,592 | 9/1958 | Ruth | 315/29 |
| 2,906,919 | 9/1959 | Thor et al. | 315/27 SR |
| 3,077,550 | 2/1963 | Macoyski | 315/29 X |
| 3,300,680 | 1/1967 | Saudinaitis | 315/29 |
| 3,343,061 | 9/1967 | Hetterscheid et al. | 315/27 R X |
| 3,385,996 | 5/1968 | Richardson | 315/27 R X |
| 3,428,856 | 2/1969 | Jones | 315/27 R |
| 3,609,447 | 9/1971 | Hirota et al. | 315/27 TD |
| 3,629,644 | 12/1971 | Waybright | 315/22 |

*Primary Examiner*—Benjamin R. Padgett
*Assistant Examiner*—P. A. Nelson
*Attorney, Agent, or Firm*—Craig & Antonelli

[57] ABSTRACT

A high voltage regulation circuit for a color television receiver comprising a horizontal deflection yoke, a high voltage circuit and a variable inductance element connected in parallel with said horizontal deflection yoke, thereby controlling the inductance of said variable inductance element in response to the variation of a high voltage of the high voltage circuit.

3 Claims, 12 Drawing Figures

INVENTORS
RYOICHI HIROTA, TOORU FUJISAMA, GENTARO MIYAZAKI,
TADAHIKO IWASAKI, MITSUHARU AKATSU, TOMOO KINOSHITA

BY Craig, Antonelli & Hill
ATTORNEYS

INVENTORS
RYOICHI HIROTA, TOORU FUJISAMA, GENTARO MIYAZAKI,
TADAHIKO IWASAKI, MITSUHARU AKATSU, TOMOO KINOSHITA
BY Craig, Antonelli & Hill
ATTORNEYS

INVENTORS

RYOICHI HIROTA, TOORU FUJISAMA, GENTARO MIYAZAKI,

TADAHIKO IWASAKI, MITSUHARU AKATSU, TOMOO KINOSHITA

BY Craig, Antonelli & Hill
ATTORNEYS

INVENTORS
RYOICHI HIROTA, TOORU FUJISAMA, GENTARO MIYAZAKI, TADAHIKO IWASAKI, MITSUHARU AKATSU, TOMOO KINOSHITA

BY Craig, Antonelli & Hill
ATTORNEYS

INVENTORS
RYOICHI HIROTA, TOORU FUJISAMA, GENTARO MIYAZAKI,
TADAHIKO IWASAKI, MITSUHARU AKATSU, TOMOO KINOSHITA
BY Craig, Antonelli & Hill
ATTORNEYS

HIGH VOLTAGE REGULATION CIRCUIT FOR A COLOR TELEVISION RECEIVER

The present application is a divisional of application Ser. No. 809,244, filed Mar. 21, 1969, now U.S. Pat. No. 3,609,447.

BACKGROUND OF THE INVENTION

1. Field of the Invention

The present invention relates to a high voltage regulation circuit, and more particularly to a circuit for regulating the anode voltage of a cathode ray tube in a color television receiver.

2. Description of the Prior Art

In a black-and-white television receiver, since the variation of the beam current of a cathode ray tube (CRT) due to the brightness of the picture is small, the variation of the high voltage due to the variation of the beam current does not cause many problems. Therefore, no high voltage regulation circuit is usually used in such a system. In a color television receiver, however, the variation of the beam current is about 5 times compared with that of the black-and-white television receiver, so that the variation of the high voltage is remarkably large. As a result, various problems occur as follows:

1. When the beam current is decreased, the high voltage is increased, so that arcing between electrodes is apt to occur;
2. When the beam current is increased, the high voltage is decreased, so that the brightness of a picture is reduced;
3. The variation of the beam current causes the horizontal and vertical raster size to be varied;
4. The deviation of the convergence varies remarkably; and
5. The deviation of the focusing is large.

Therefore, in order to prevent the occurrence of such problems, it is required to regulate the high voltage.

The known high voltage regulation circuit is such that a shunt regulator tube is connected in parallel with the high voltage output, whereby the anode voltage is regulated to maintain substantially a predetermined value with variation of the beam current of the CRT. However, the shunt regulator tube is a triode of a special type which wears quickly with a high anode voltage and a large anode loss, and therefore, it is very expensive, has a short life and is not economical. Further, in a color television receiver in which an anode voltage exceeding 20 kilovolts is used a shunt regulator tube provided therewith radiates X-ray, so that it injuriously affects the human body. Furthermore, such known high voltage regulation circuit makes it difficult to realize an all transistorized color television receiver.

SUMMARY OF THE INVENTION

An object of the present invention is to provide a novel high voltage regulation circuit without using a shunt regulator tube.

Another object of the present invention is to provide a high voltage regulation circuit which makes it possible to realize an all transistorized color television receiver.

In order to achieve the above-mentioned objects, the circuit according to the present invention is comprised of a high voltage regulation coil (generally referred to as a variable inductance element) connected in parallel with the horizontal deflection coil, which is variable in inductance, and a means for detecting a variable component of the high voltage and for controlling the inductance of the high voltage regulation coil in response to the thus detected signal.

Other objects, features and advantages of the present invention will be apparent from the following detailed description taken in conjunction with the accompanying drawings.

DESCRIPTION OF THE PREFERRED EMBODIMENTS

Figure 1:
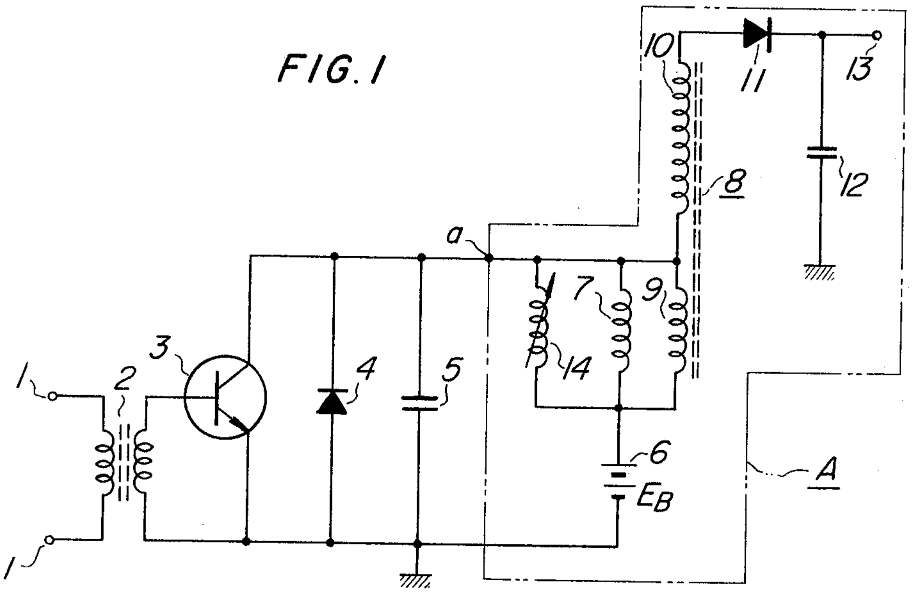
FIG. 1 is a circuit diagram explaining the basic principle of the present invention.

Referring to FIG. 1, the basic principle of the present invention will be described, in which numeral 1 designates pulse input terminals, 2 a transformer, 3 a horizontal output transistor, 4 a damper diode, 5 a resonance capacitor, 6 a voltage source, 7 a horizontal deflection yoke, 8 a flyback transformer (FBT), 9 a primary winding of the flyback transformer, 10 a secondary winding of the flyback transformer, 11 a high voltage rectifying diode, 12 a capacitor and 13 high voltage output terminals. The constitution of the above circuit is entirely the same as the horizontal output circuit and high voltage circuit of the conventional color television receiver. Numeral 14 designates a high voltage regulation coil, which is connected in parallel with the horizontal deflection coil, the invention being characterized thereby.

Figure 2:
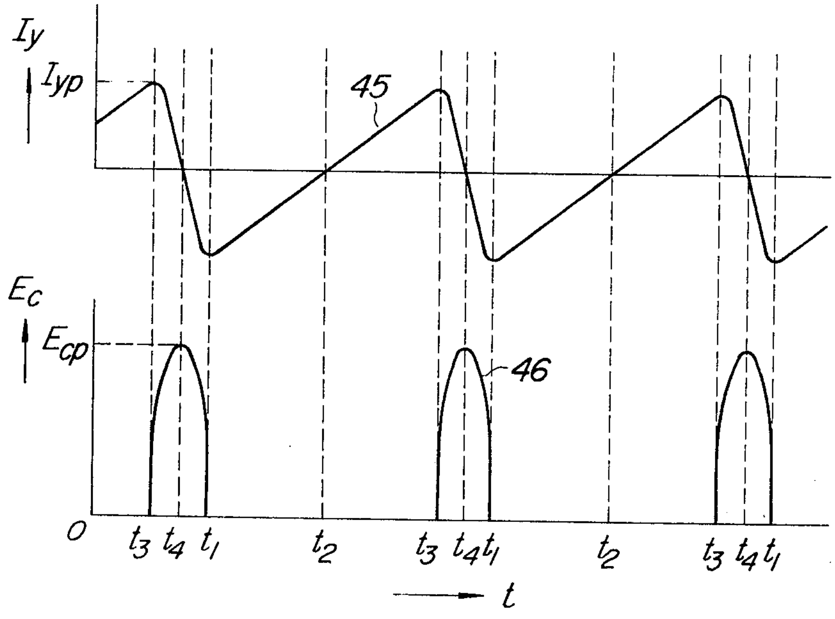
FIG. 2 is a diagram showing waveforms of voltage and current for explaining the operation of the horizontal deflection circuit and the high voltage circuit in a color television receiver.

FIG. 2 shows functional waveforms of the horizontal deflection output, in which numeral 45 is the waveform of the current flowing into the horizontal deflection yoke 7, 46 the waveform of the collector voltage of the horizontal output transistor 3, $t_1 \rightarrow t_2 \rightarrow t_3$ the scanning term and $t_3 \rightarrow t_4 \rightarrow t_1$ the flyback term. The operation of the present invention will be described hereinafter.

Though the following description of the operation is made in regard to a transistorized television receiver, it is needless to say that the description can be employed also in a vacuum tube type television receiver. It is now assumed that since the inductance $L_p$ of the primary winding 9 of the flyback transformer 8 is generally sufficiently large as compared with the inductance $L_v$ of the horizontal deflection yoke 7, the inductance $L_p$ is negligible.

Now the parallel inductance $L$ of the horizontal deflection yoke 7 and the high voltage regulation coil 14 is expressed as:

$$L = L_X \cdot L_Y/(L_X + L_Y) \quad (1)$$

where $L_X$ represents the inductance of the high voltage regulation coil. Assuming that $I_y$ represents a current flowing in the horizontal deflection yoke 7 and $I_x$ represents that flowing in the high voltage regulation coil 14, the sum of the currents $I_{xy}$ is expressed as:

$$I_{xy} = I_x + I_y \quad (2)$$

If when $t = t_2$ an input pulse is applied to the input terminal 1, the horizontal output transistor 3 is made conductive, the voltage $E_B$ of the power source 6 is applied across the horizontal yoke 7, and the yoke current $I_y$ is linearly increased at the constant rate of $E_B/L_y$ as;

when $t_2 \leqq t \leqq t_3$ $$I_y = (E_B/L_y)(t - t_2) \quad (3)$$

$$I_{xy} = (E_B/L)(t - t_2) \quad (4)$$

Next, when $t = t_3$, $I_y$ is the maximum value $I_{yp}$ and $I_{xy}$ is the sum $I_{xyp}$ of the maximum current flowing through the horizontal deflection yoke 7 and that flowing through the high voltage regulation coil 14, the horizontal output transistor 3 is cut off and the flyback term starts. Now, consider the case without the high voltage regulation coil 14. The yoke current $I_y$ flows into the resonance capacitor 5, so that parallel resonance is caused by the inductance $L_y$ of the horizontal deflection yoke 7 and the capacitance C of the resonance capacitor 5 and thus, a high pulse voltage as shown by waveform 46 in FIG. 2 is developed at the collector of the horizontal output transistor 3. That is, when $t_3 \leqq t \leqq t_1$, $I_y$ is expressed approximately by:

$$I_y \approx I_{yp} \cdot \cos (t - t_3)/\sqrt{L_y/C} \quad (5)$$

the collector voltage $E_C$ is given by:

$$E_C \approx -L_y(dI_y/dt) \approx I_{yp} \sqrt{L_y/C} \sin (t - t_3)/\sqrt{L_yC} \quad (6)$$

and therefore, at approximately a quarter of the resonance period, namely, when $t = t_4$, $E_C$ makes its maximum voltages $E_{cp}$.

$$E_{cp} = I_{yp} \sqrt{L_y/C} \quad (7)$$

On the other hand, the yoke current $I_y$ which reaches the positive maximum value at $t = t_3$ becomes zero at $t = t_4$ and thereafter the direction of $I_y$ is reversed. At $t = t_1$ the yoke current $I_y$ reaches the negative maximum value $-I_{yp}$ and simultaneously the collector voltage $E_C$ becomes zero. Thereafter, $E_C$ develops a negative voltage and then the damper diode 5 conducts so that the scanning term starts. At this time, the source voltage $E_B$ is again applied across the deflection yoke 7, the yoke current $I_y$ is linearly increased from $-I_{yp}$ at the constant rate of $E_B/L_y$, and thus, it becomes zero at $t = t_2$. Then, if an input pulse is again applied to the input terminal 1, the transistor 3 is rendered conductive to return to its initial state. Thus, by repeating such a cycle horizontal scanning is carried out.

Further, the anode voltage of the cathode ray tube is provided in such a manner that the high pulse voltage $E_C$ developed at the collector terminal of the horizontal output transistor 3 during operation of the aforementioned flyback transformer which is boosted by the flyback transformer 8 and the voltage appearing across a secondary winding 10 of the transformer 8 is rectified by the high voltage rectifier diode 11. Therefore, the basic principles of the present invention for regulating the variation of the above-mentioned anode voltage are to control the voltage developed across the primary winding 9 of the flyback transformer 8, i.e., the collector voltage $E_C$ of the horizontal output transistor 3 in response to the amount of variation in anode voltage so as to reduce the variation thereof.

On the other hand, consider the case where the high voltage regulation circuit 14 is added to the horizontal deflection circuit. During the scanning term, $t_2 \leqq t \leqq t_3$, no variation in yoke current $I_y$ occurs even upon the addition of the coil 14, as indicated by the formula (3), since the coil 14 and the yoke 7 are connected in parallel to each other with respect to the power source 6. Therefore, the raster size is not varied.

On the other hand, when $t_3 \leqq t \leqq t_1$, namely, during the flyback term, a resonance circuit is constituted by the coil 7, the coil 14 and the capacitor 5, whose resonance current $I_{xy}$ (i.e. the sum of current flowing in the yoke 7 and the coil 14) is given approximately by:

$$I_{xy} \approx I_{xyp} \cos (t - t_3)/\sqrt{LC} \quad (8)$$

Also, the collector voltage $E_C$ of the transistor 3 is given approximately $$E_C \approx -L(dI_{xy}/dt) \approx I_{xyp} \sqrt{L/C} \sin (t - t_3)/LC \quad (9)$$

Therefore, $E_C$ makes the maximum voltage $E_{cp}$ at $t = t_4$.

$$E_{cp} = I_{xyp} \sqrt{L/C} \quad (10)$$

On the other hand, the maximum current $I_{xyp}$ of $I_{xy}$ is obtained from the formula (4) as:

$$I_{xyp} = (E_B/L)(t_3 - t_2) \quad (11)$$

From the formulas (10) and (11) the aforementioned maximum voltage $E_{cp}$ can also be given by:

$$E_{cp} = E_B/\sqrt{LC}(t_3 - t_2) \quad (12)$$

From the formula (12), it will be understood that the peak value $E_{cp}$ of a pulse appearing at the collector of the transistor 3 caries inversely with the root of the parallel inductance L. Thus, for example, in case the beam current of the CRT is increased so that the anode voltage is lowered, in order to regulate the lowered anode voltage, the drop component thereof must be compensated. For this purpose, the voltage $E_{cp}$ can be made to rise. In other words, the parallel inductance $L$ will be reduced. Also, from formula (1) it is seen that the inductance $L_x$ of the high voltage regulation coil will be reduced. In order to vary the inductance $L_x$ the number of turns of the coil 14 is varied or magnetic saturation in a core which is inserted into the coil 14 is used. The method for varying the number of turns of the coil 14 is such that a plurality of taps are provided on the coil 14 and these are suitably changed over depending upon the variation of a beam current of the CRT. However, the utilization of magnetic saturation of the core is the most simple and effective method.

Description will be made of some embodiments according to the present invention in detail hereunder. The following embodiments are shown merely by an essential portion A taken by separating the associated circuit at a point $a$ in FIG. 1.

Figure 3:
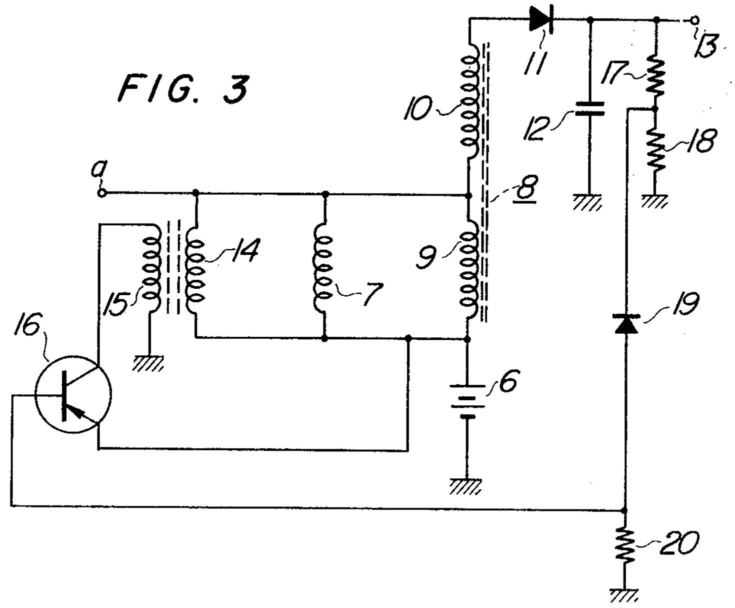
FIG. 3 is a diagram showing an essential portion of the circuit according to an embodiment of the present invention.

Referring to FIG. 3, there is shown one embodiment of the present invention, in which reference numerals of parts correspond to those in FIG. 1, numeral 15 designates a control winding for controlling the inductance $L_x$ of the high voltage regulation coil 14, 16 a high voltage regulation transistor, 17 and 18 high voltage dividing resistors, 19 a zener diode and 20 a resistor.

Figure 4A:
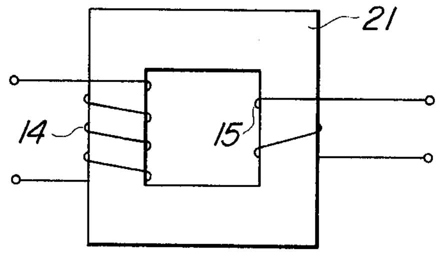
FIGS. 4*a* and 4*b* are diagrams showing embodiments of a high voltage regulation coil.

Operation of the aforementioned embodiment will be described. A variation of the anode voltage is detected across the high voltage dividing resistor 18, and the thus-detected signal corresponding to the variation is applied through the zener diode 19 to the base electrode of the high voltage regulation transistor 16. The emitter electrode of the transistor 16 is connected to the power source 6 and the collector electrode is connected to one end of the control winding 15, the other being grounded. One embodiment of a high voltage regulation variable reactance $L_x$ is shown in FIG. 4*a*, in which numeral 21 represents a saturable core, 14 and 15 the high voltage regulation coil and the control winding, respectively. The magnetic flux density of the saturable core 21 is controlled by the magnitude of the current flowing in the control winding 15. That is, when the current flowing in the winding 15 increases so that the magnetic flux density of the saturable core 21 approaches the saturation magnetic flux density thereof, the magnetic permeability is decreased, so that the inductance $L_x$ of the winding 14 is also reduced. Further, if the current is decreased the reverse phenomenon takes place; namely, the magnetic permeability $\mu$ is increased and the reactance $L_x$ is also increased.

The high voltage regulation variable inductance $L_x$ which is constituted as described above operates in such a manner that if the anode voltage is decreased, the base voltage of the transistor 16 is lowered and the collector current passing through the control winding 15 is increased whereby the magnetic flux density of the saturable core 21 approaches the saturation magnetic flux density thereof, so that the inductance $L_x$ is decreased and the collector voltage of the horizontal output transistor 3 is increased. Thus, high voltage regulation can be achieved.

Figure 4B:
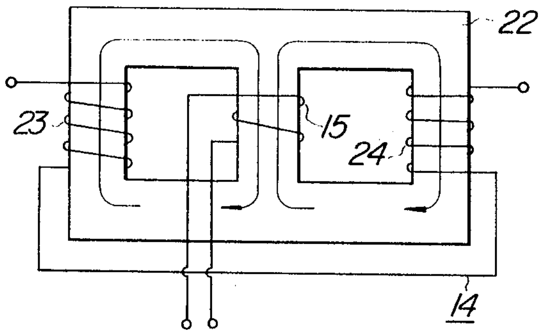

FIG. 4*b* shows another embodiment of the high voltage regulation variable inductance $L_x$ whose operation is the same as that in FIG. 4*a*, the description thereof being omitted accordingly. The construction is such that windings 23 and 24 into which the high voltage regulation coil 14 are separated are wound around a tripod type saturable core 22 and the control winding 15 is also wound therearound.

The thus-constructed inductance is advantageous in that since no voltage is induced in the control winding 15 by the voltage appearing across the high voltage regulation coil 14 depending upon the variation of the beam current of the CRT, the protection of the high voltage regulation transistor 16 can be provided. On the contrary, the same effect is obtained also with such a construction of the variable inductance that the windings 23 and 24 are used as control windings and the winding 15 is used as a high voltage regulation coil. In FIG. 3, a signal detected across the dividiing resistor 18 may be applied directly to the base electrode of the transistor 16'. However, if the zener diode 19 is inserted between the resistor 18 and the base electrode of the transistor 16, the base D.C. potential can advantageously be selected arbitrarily.

Figure 5:
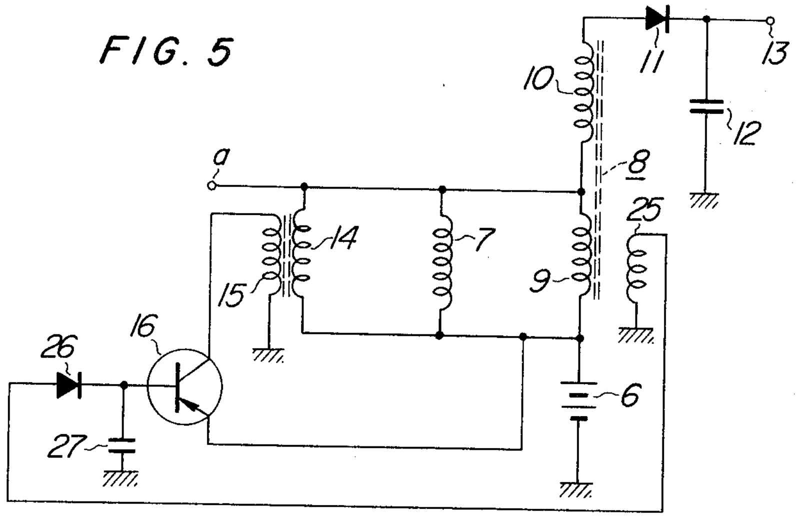
FIGS. 5 and 6 are diagrams showing an essential portion of the circuit according to another embodiment of the present invention.

Referring to FIG. 5, there is shown a circuit diagram of a further embodiment of the present invention, in which reference numerals of parts used therein correspond to those in FIG. 3, numeral 25 represents a winding wound around the flyback transformer 8 for detecting a variation in high voltage, 26 a diode and 27 a capacitor.

The regulating operation in the aforementioned circuit is entirely the same as that of the embodiment shown in FIG. 3. It is, however, different in the means for detecting the variation in anode voltage. That is, in this embodiment, a positive pulse induced in the detecting windings 25 wound around the flyback transformer 8 is rectified smoothly through the diode 26 and the capacitor 27 and thereafter it is applied to the base electrode of the high voltage regulation transistor 16.

Figure 6:
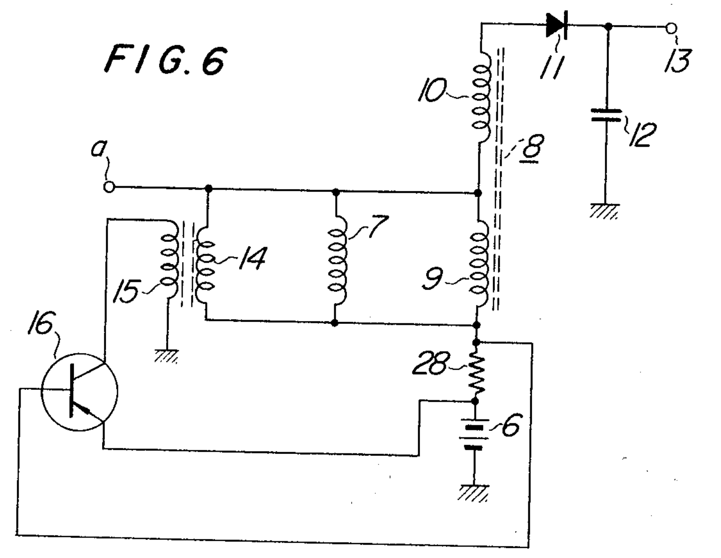

Referring to FIG. 6, there is shown a circuit diagram of a further embodiment of the present invention, in which reference numerals of parts used therein correspond to those in FIG. 3 and numeral 28 represents a resistor. In this embodiment, a current passing through the D.C. voltage source is used as a means for detecting the variation in anode voltage. For example, as the beam current of the CRT is increased, the current of the D.C. voltage source for supplying the power increases. Therefore, if the resistor 28 is connected in series to the source 6, a voltage which is variable according to the high voltage can be derived across the resistor 28. Thus, the derived voltage across the resistor is applied to the beam electrode of the high voltage regulation transistor 16.

Figure 7:
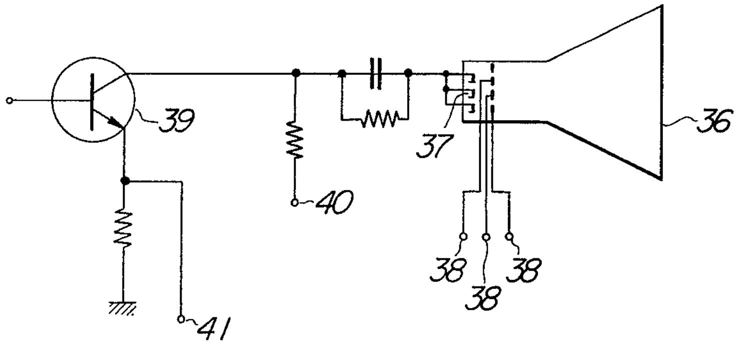
FIG. 7 is a diagram showing an embodied circuit for deriving a control signal.

In the aforementioned respective embodiments, the variation in high voltage is derived from the high voltage circuit or the horizontal deflection circuit. It is, however, not limited to such an arrangement. For example, the variation in high voltage can be obtained in such a manner that a voltage proportional to the amplitude of the luminance signal $E_y$ or that of the chrominance signal is derived from the transistor developing an output of the luminance signal or the chrominance signal. Various methods for applying the luminance signal and the chrominance signal to a cathode ray tube are proposed. Referring to FIG. 7, there is shown a circuit for deriving the variation in anode voltage from a transistor in the last stage developing a luminance signal in a color difference system in which the luminance signal and the difference signal between the lumiance signal and a chrominance signal are applied to the cathode and the grids of a cathode ray tube, respectively. In the figure, numeral 36 represents a cathode ray tube, 37 the cathode thereof, 38 terminals for applying the difference signals between a luminance signal and the respective chrominance signals to the grids of the CRT, 39 a video signal output transistor, 40 a power source terminal and 41 an output terminal for a control signal. An output signal from the control signal output terminal 41 is applied to the base electrode of the high voltage regulation transistor 16 shown in the abovementioned embodiments. Similarly in the respective chrominance signals, each control signal can be introduced from each transistor in its last stage. The luminance signal $E_y$ is given by $$E_y = 0.30E_R + 0.59E_G + 0.11E_B \quad (13)$$

where $E_R$, $E_G$ and $E_B$ represent the voltage components of red, green and blue signals, respectively. In particular, since the variation of the green signal $E_G$ is nearer to that of the luminance signal $E_y$ than those of the remainder, the variation of the green signal $E_G$ is used as another control signal applied to the regulation transistor 16.

Figure 8:
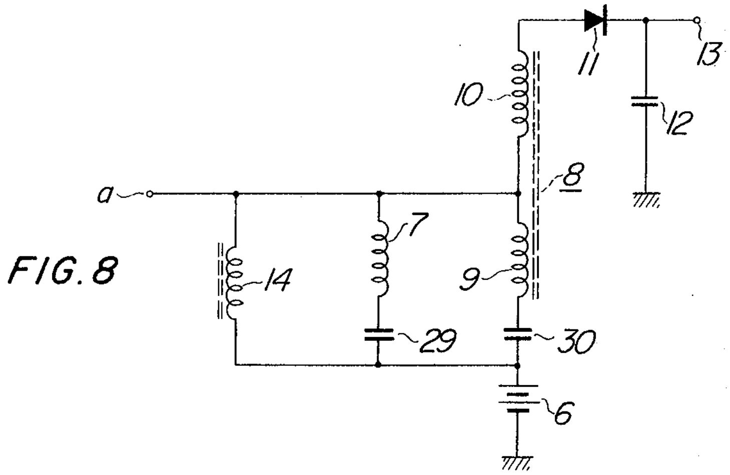
FIGS. 8 to 11 are diagrams showing essential portions of the circuit according to further embodiments of the present invention.

Referring to FIG. 8, there is shown a circuit of a still further embodiment of the present invention, in which reference numerals of parts correspond to those in FIG. 1, and numerals 29 and 30 represent D.C. blocking capacitors. In this embodiment, no high voltage regulation transistor and control winding are required contrary to the above-mentioned embodiments and thus, the high voltage regulation circuit is quite simple and economical. The circuit of the present embodiment is so constituted that the D.C. blocking capacitors 30 and 29 are connected in series with the primary winding 9 of the flyback transformer 8 and the horizontal deflection yoke 7, respectively, so that all of the D.C. current supplied from the D.C. power source 6 to the transformer 8 flows in the high voltage regulation coil 14. As high voltage regulation coil 14, for example, a coil wound around a saturable core is used. If the beam current of the CRT is increased, the D.C. current flowing in the high voltage regulation coil 14 is also increased. As a result, the magnetic flux density of the saturable core approaches the saturation flux density thereof, so that the inductance $L_x$ of the coil 14 is reduced to cause the circuit to boost the reduced high voltage, thus the circuit is operated to regulate the high voltage. The circuit in this case is advantageous in that since the D.C. current flowing in the flyback transformer 8 is blocked by means of the D.C. blocking capacitor 30, the flyback transformer 8 is not easily saturated, thereby making it possible to provide a transformer of small size.

Figure 9:
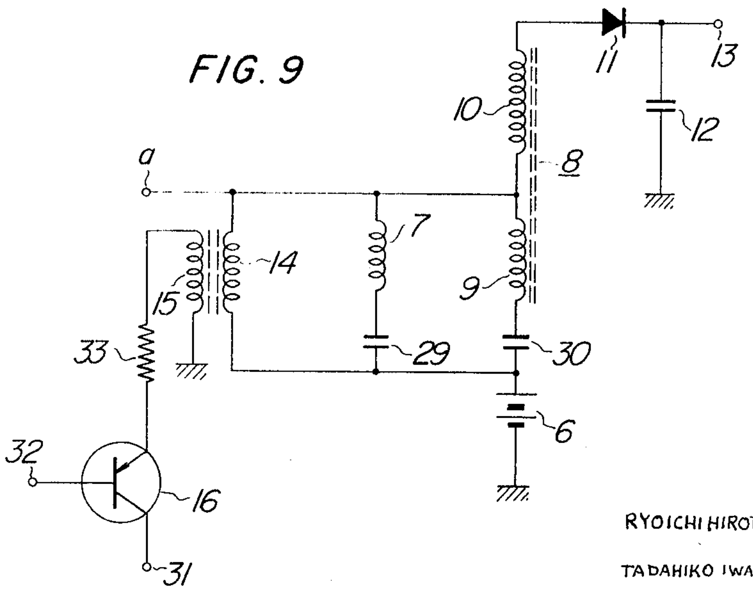

Referring to FIG. 9, a circuit diagram of still another embodiment of the present invention is illustrated, in which reference numerals of parts used therein correspond to those in FIGS. 3 and 8, numeral 31 designates a D.C. power source terminal, 32 an input terminal for a control signal and 33 a resistor inserted between the emitter electrode of the transistor 16 and the control winding 15. In the present embodiment means for controlling the high voltage regulation coil 14 comprise in combination a control winding 15 wound around a saturable core and the D.C. blocking capacitors 20 and 30 which are provided to thereby make all of the D.C. current flow in the coil 14 wound around the saturable core. The control input terminal 32 is impressed with a signal detected in the manner as described above. As the high voltage regulation transistor 16, any npn type or pnp type transistor may be used. Needless to say, the polarity of the drive source or the control signal should be taken into consideration according to the type of transistor used therein.

In FIG. 9, the transistor 16 for driving the control winding 15 is used in the form of an emitter follower circuit. Such arrangement prevents the transistor 16 from being subjected to deterioration due to a spark occurring in the color picture tube or in the high voltage rectifier tube. Furthermore, in case the resistance 33 is connected in series with the emitter electrode of the transistor 16 of the emitter-follower, supposing that R is the resistance of the resistor 33, $r$ is the input resistance of the network involving the transistor which is observed at the side of the emitter and $V$ is a surge pulse voltage developed across the control winding, the voltage, $(r/R+r=r)\cdot V$ is impressed on the transistor 16 and the input resistance $r$ is normally appreciably small. Therefore, the insertion of the resistor 33 does effectively protect the transistor from such surge pulse voltage. Further no control is affected by the insertion of the resistor 33 because the current amplification factor of the transistor 16 is independent of it. Needless to say, such emitter-follower circuit is not limited to the use of the embodiment in FIG. 9 and therefore, it is applicable also to the above-mentioned embodiment in which a transistor amplifier is employed.

Figure 10:
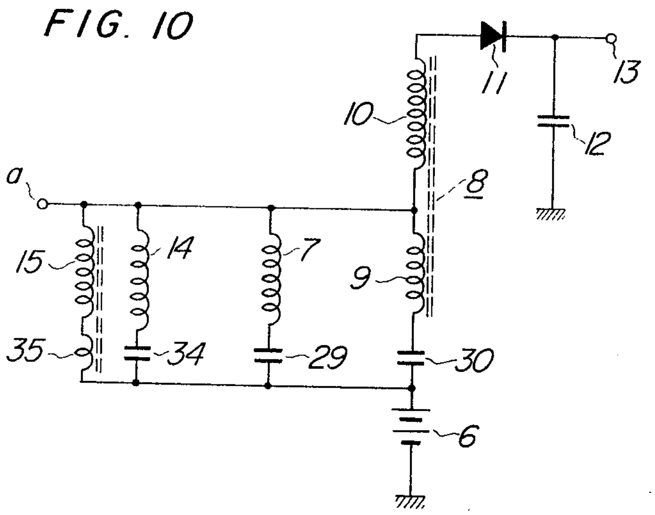

Referring to FIG. 10, there is shown a circuit diagram of a further embodiment of the present invention, in which reference numerals of parts used therein correspond to those in FIG. 1, numerals 29, 30 and 34 represent D.C. blocking capacitors, 15 a control winding and 35 an inductance element for preventing an A.C. current from flowing in the control winding 15. The present embodiment is such that the inductance $L_x$ of the high voltage regulation coil 14 is controlled by the variation of a D.C. current supplied from the D.C. source 6 which is caused by the variation of the high voltage as in the embodiment of FIG. 8. That is, if the beam current of the CRT is increased, the D.C. current from the D.C. power source 6 is increased to flow in the control winding 15. Therefore, by the effect of the saturable core around which the high voltage regulation coil 14 and the control winding 15 are wound the inductance $L_x$ of the coil 14 is reduced, thus operating to regulate the variation in high voltage.

Figure 11:
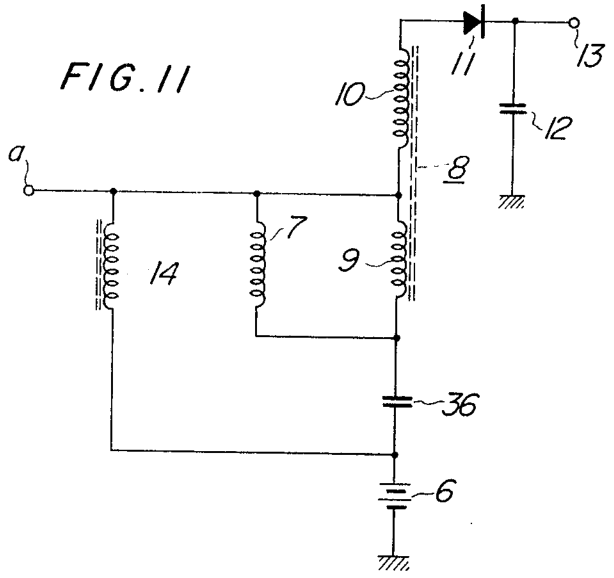

Referring to FIG. 11 there is shown a circuit of still another embodiment of the present invention, in which reference numerals of parts used therein correspond to those in FIG. 1 and numeral 36 represents a D.C. blocking capacitor. In this embodiment, the capacitor 36 serves as the D.C. blocking capacitors 29 and 30 shown in the embodiment of FIG. 8, whose operation is the same as that of the embodiment of FIG. 8. It should be noted that the art of this kind is applicable to the embodiment shown in FIG. 10 in the same manner.

As described in detail hereinbefore, since the present invention can regulate the high voltage without using a shunt regulator tube as in the prior art, the high voltage regulation circuit of the television set can be made of small size without involving any problem of heat-sinking. Further, the regulation circuit according to the present invention having no shunt regulator tube which is expensive therein is quite economical and permits reduction of emission sources of X-rays which are harmful to the human body. Furthermore, the present invention is advantageous since it makes it possible to achieve all transistorized color television receiver.

The above-mentioned various embodiments of the present invention have been described merely for illustration, and various modifications and changes are possible. therefore, the scope of the present invention should not be limited to these embodiments.

We claim:

1. In a horizontal deflection and high voltage system for television including a D.C. power source for supplying a D.C. voltage to the system, a high voltage terminal for connection to a picture tube, a horizontal deflection yoke energizable to produce line deflection of an electron beam, switching means connected to said horizontal deflection yoke for supplying an energizing voltage to said horizontal deflection yoke to produce line trace movements of the electron beam and for cutting off such energizing voltage to produce retrace movements of the electron beam in response to input horizontal deflection synchronizing signals, transformer means connected to said horizontal deflection yoke for producing a high voltage flyback pulse, and rectifying means connected to said high voltage terminal for rectifying the flyback pulse to produce high voltage power for electron beam acceleration, a high voltage regulation circuit comprising:

variable inductance means comprising a saturable core, a high voltage regulation coil wound around at least one portion of said saturable core, said high voltage regulation coil, said horizontal deflection yoke and said transformer means being connected together in parallel;

a control winding wound around a different portion of said saturable core, one end of the control winding being connected to said switching means;

D.C. blocking means connected between said D.C. power source and said switching means for preventing a D.C. current from flowing into said high voltage regulation coil, said horizontal deflection yoke and said transformer means; and an inductance element connected in series with said control winding between said D.C. power source and said switching means for preventing an A.C. current from flowing into the control winding;

whereby the inductance of said high voltage regulation coil is controlled so as to decrease or increase in inductance in response to an increase or a decrease, respectively, in the D.C. current flowing from said D.C. power source into said control winding.

2. The system according to claim 1, wherein said D.C. blocking means comprises three capacitors, each connected in series with said high voltage regulation coil, said horizontal deflection yoke and said transformer means, respectively.

3. The system according to claim 1, wherein said D.C. blocking means is a capacitor connected between said D.C. power source and the parallel circuit of said high voltage regulation coil, said horizontal deflection yoke and said transformer means.

* * * * *